United States Patent
Lee et al.

(10) Patent No.: US 12,146,994 B2
(45) Date of Patent: Nov. 19, 2024

(54) COMPTON IMAGING APPARATUS AND SINGLE PHOTON EMISSION AND POSITRON EMISSION TOMOGRAPHY SYSTEM COMPRISING SAME

(71) Applicant: KOREA UNIVERSITY RESEARCH AND BUSINESS FOUNDATION, Seoul (KR)

(72) Inventors: Wonho Lee, Seoul (KR); Ajin Jo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 304 days.

(21) Appl. No.: 17/762,618

(22) PCT Filed: Mar. 12, 2020

(86) PCT No.: PCT/KR2020/003429
§ 371 (c)(1),
(2) Date: Mar. 22, 2022

(87) PCT Pub. No.: WO2021/075646
PCT Pub. Date: Apr. 22, 2021

(65) Prior Publication Data
US 2022/0334268 A1 Oct. 20, 2022

(30) Foreign Application Priority Data

Oct. 17, 2019 (KR) .................. 10-2019-0129188

(51) Int. Cl.
*G01T 1/164* (2006.01)
*G01T 1/29* (2006.01)

(52) U.S. Cl.
CPC .......... *G01T 1/1648* (2013.01); *G01T 1/1647* (2013.01); *G01T 1/2985* (2013.01)

(58) Field of Classification Search
CPC ............... G01T 1/1648; G01T 1/1647; G01T 1/2985; G01T 1/161; G01T 1/1603; A61B 6/037; A61B 6/4258; A61B 6/5205
See application file for complete search history.

(56) References Cited

U.S. PATENT DOCUMENTS

| 7,818,048 B2 | 10/2010 | Tumer et al. |
| 11,789,164 B2 * | 10/2023 | Chen ...................... G01T 1/2002 250/363.04 |

(Continued)

FOREIGN PATENT DOCUMENTS

| JP | 2018-522216 A | 8/2018 |
| KR | 10-2010-0118467 A | 11/2010 |
| KR | 10-2013-0015619 A | 2/2013 |

OTHER PUBLICATIONS

International Search Report issued on Jul. 17, 2020 in counterpart International Patent Application No. PCT/KR2020/003429 (2 pages in English and 3 pages in Korean).

*Primary Examiner* — David P Porta
*Assistant Examiner* — Casey Bryant
(74) *Attorney, Agent, or Firm* — NSIP Law

(57) ABSTRACT

The present invention relates to a Compton imaging apparatus and a single photon emission and positron emission tomography system comprising the Compton imaging apparatus and, more specifically, to a Compton imaging apparatus based on a single scintillator and a single photon emission and positron emission tomography system including the Compton imaging apparatus. The Compton imaging apparatus according to the present invention may reconstruct a Compton image based on the single scintillator composed of a plurality of scintillation cells. Thus, the Compton imaging apparatus of the present invention is cheaper than any other Compton imaging apparatuses and has an excellent time resolution such that the Compton imaging apparatus can be (Continued)

used even in a high-radiation area. Also, the single photon emission and positron emission tomography system using the Compton imaging apparatus can improve radiation detection efficiency and an image resolution, to thereby improve image quality.

15 Claims, 8 Drawing Sheets

(56) References Cited

U.S. PATENT DOCUMENTS

| 2010/0148075 | A1* | 6/2010 | Chinn | A61B 6/037 |
| | | | | 250/363.04 |
| 2018/0136344 | A1* | 5/2018 | Nelson | A61B 6/4417 |
| 2018/0217276 | A1* | 8/2018 | Iltis | G01T 1/1642 |
| 2019/0079204 | A1* | 3/2019 | Uchida | G01T 1/1647 |

* cited by examiner

[FIG. 1]
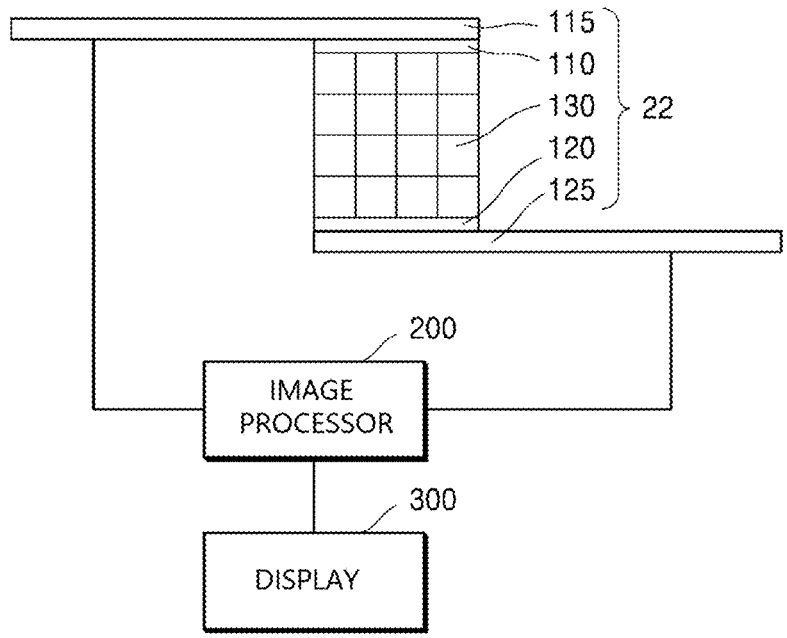
[FIG. 2]
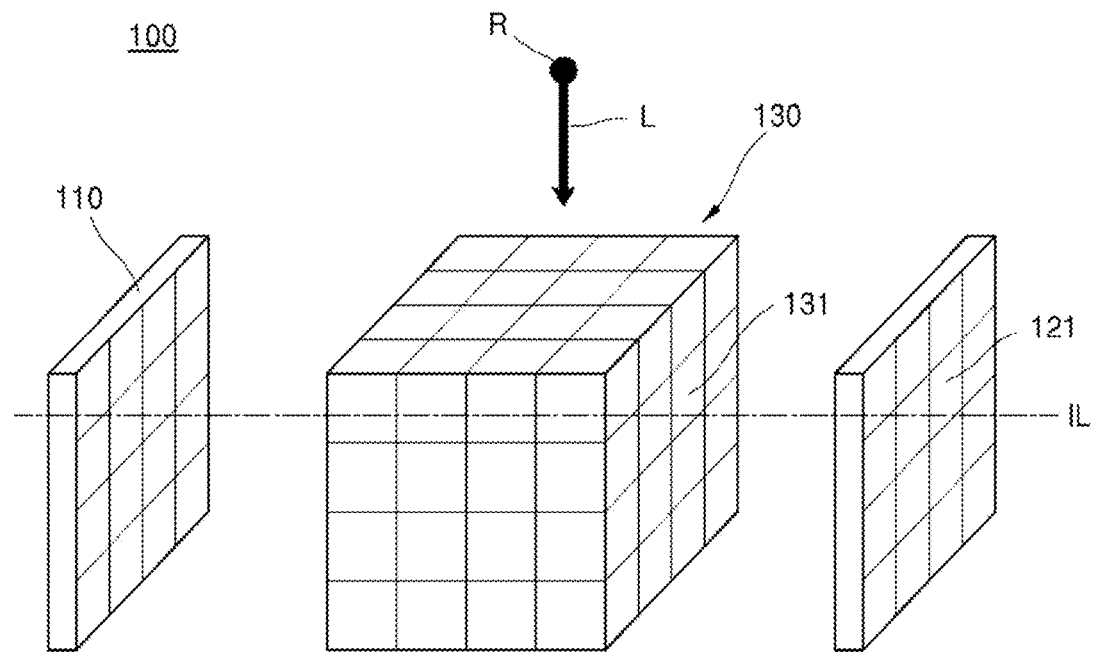

[FIG. 3a]
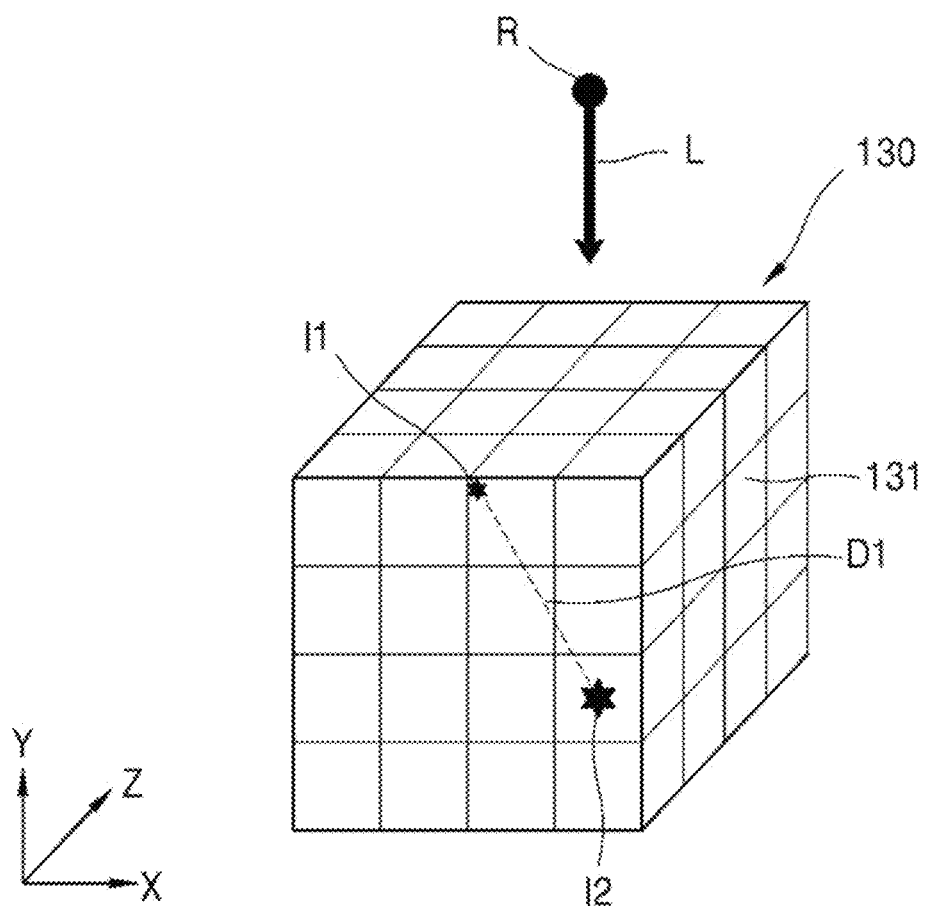

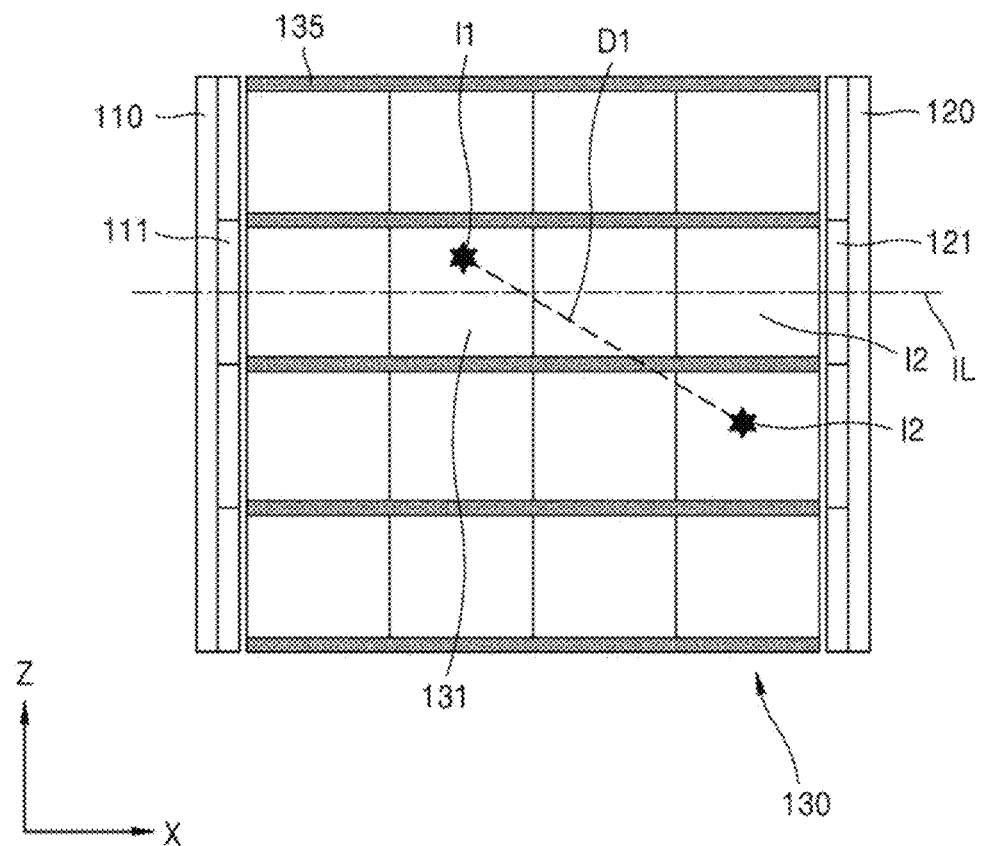
[FIG. 3b]

[FIG. 4]
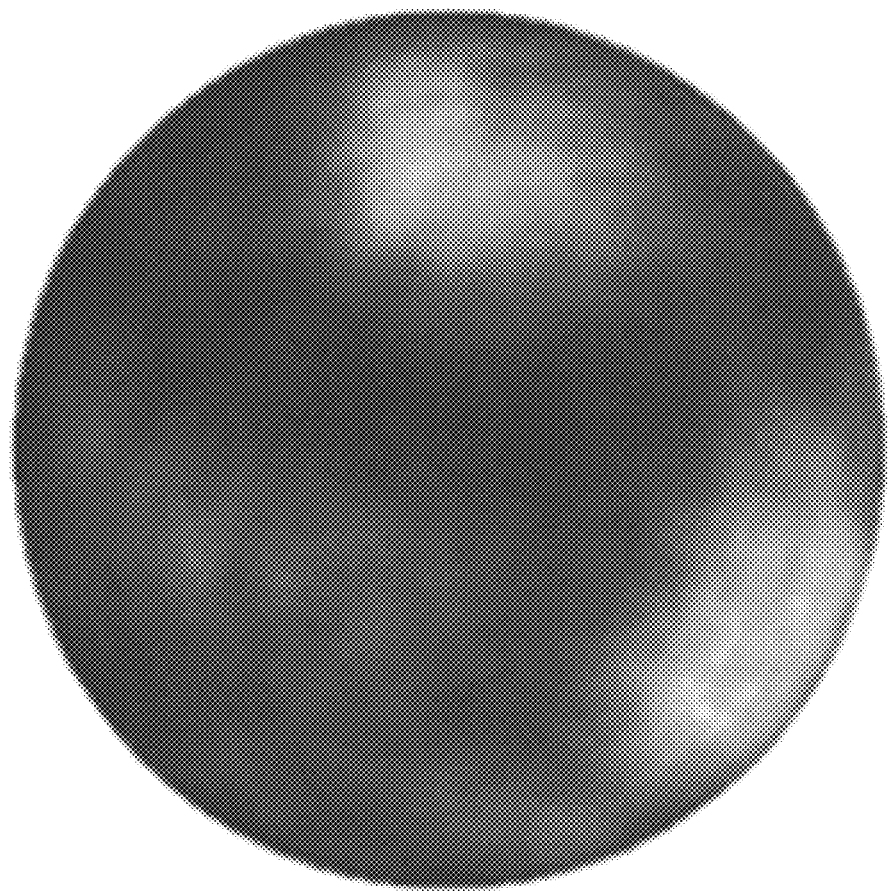

[FIG. 5]
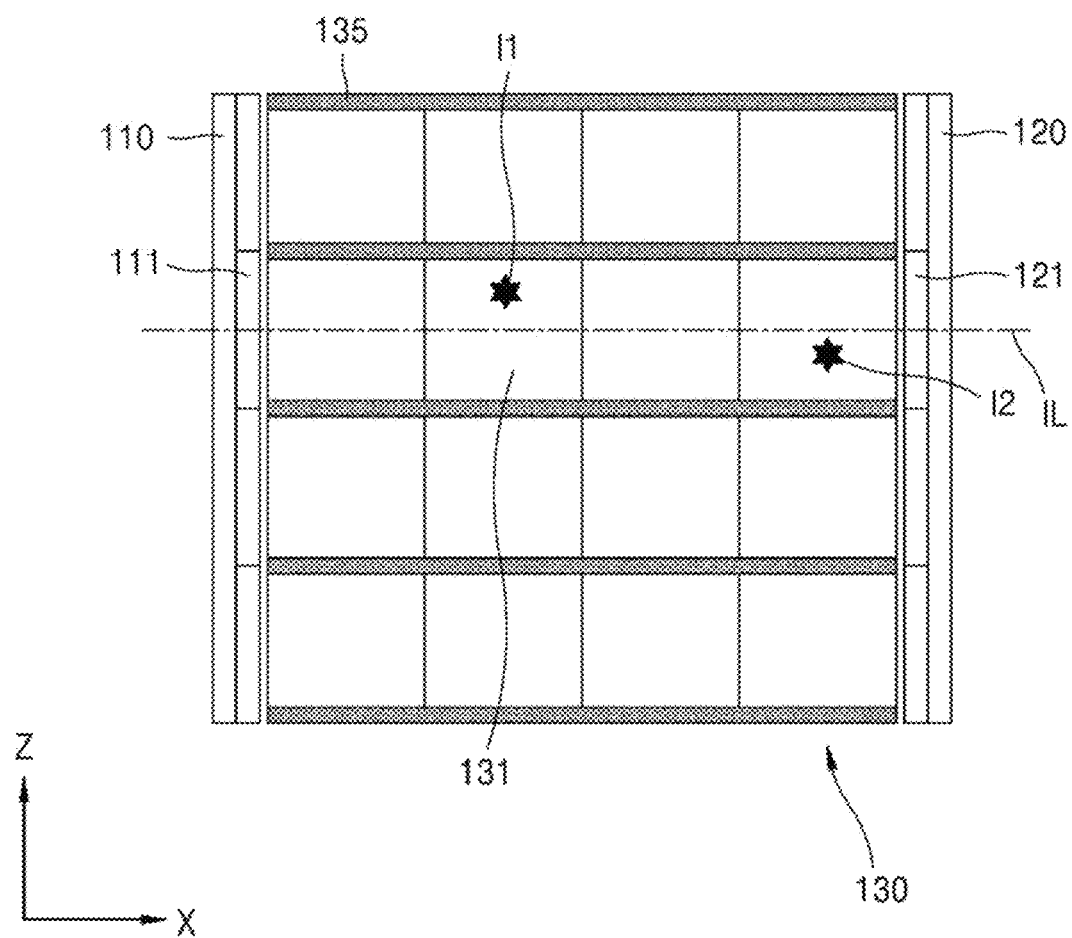

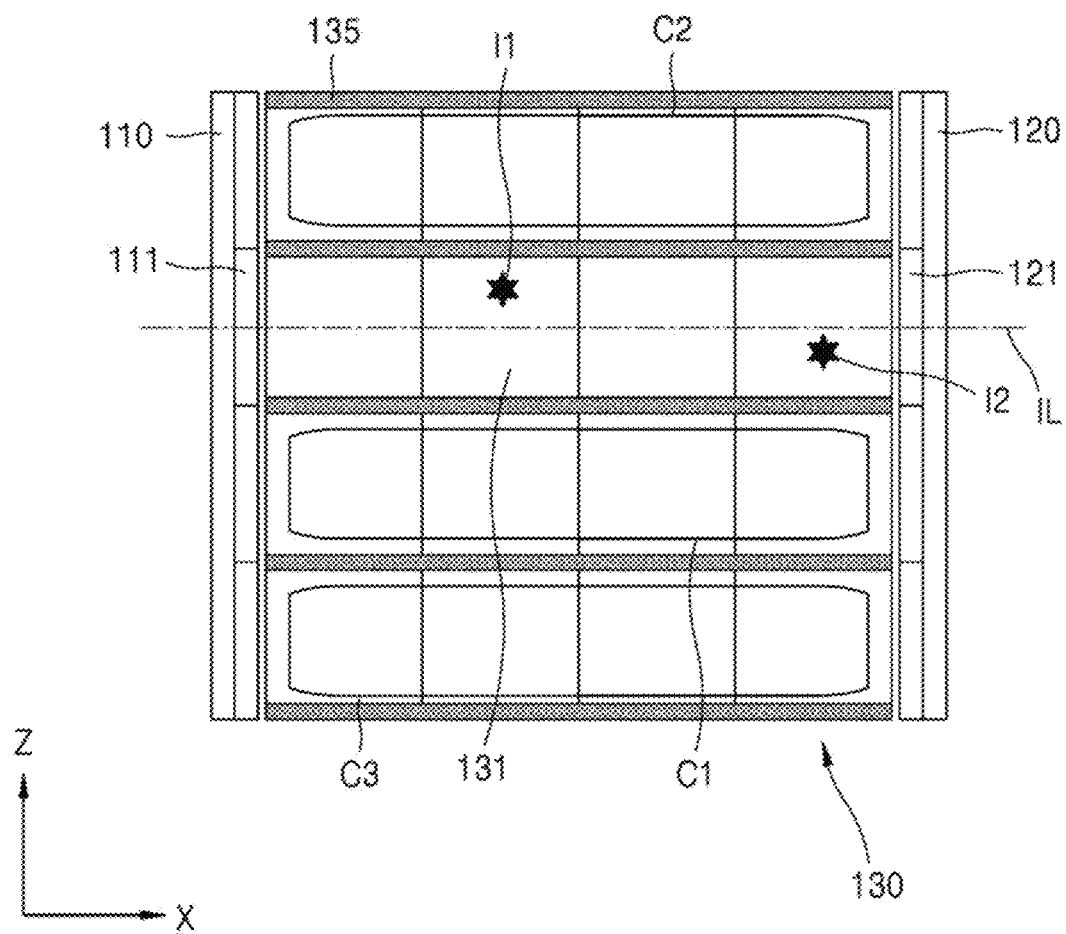
[FIG. 6]

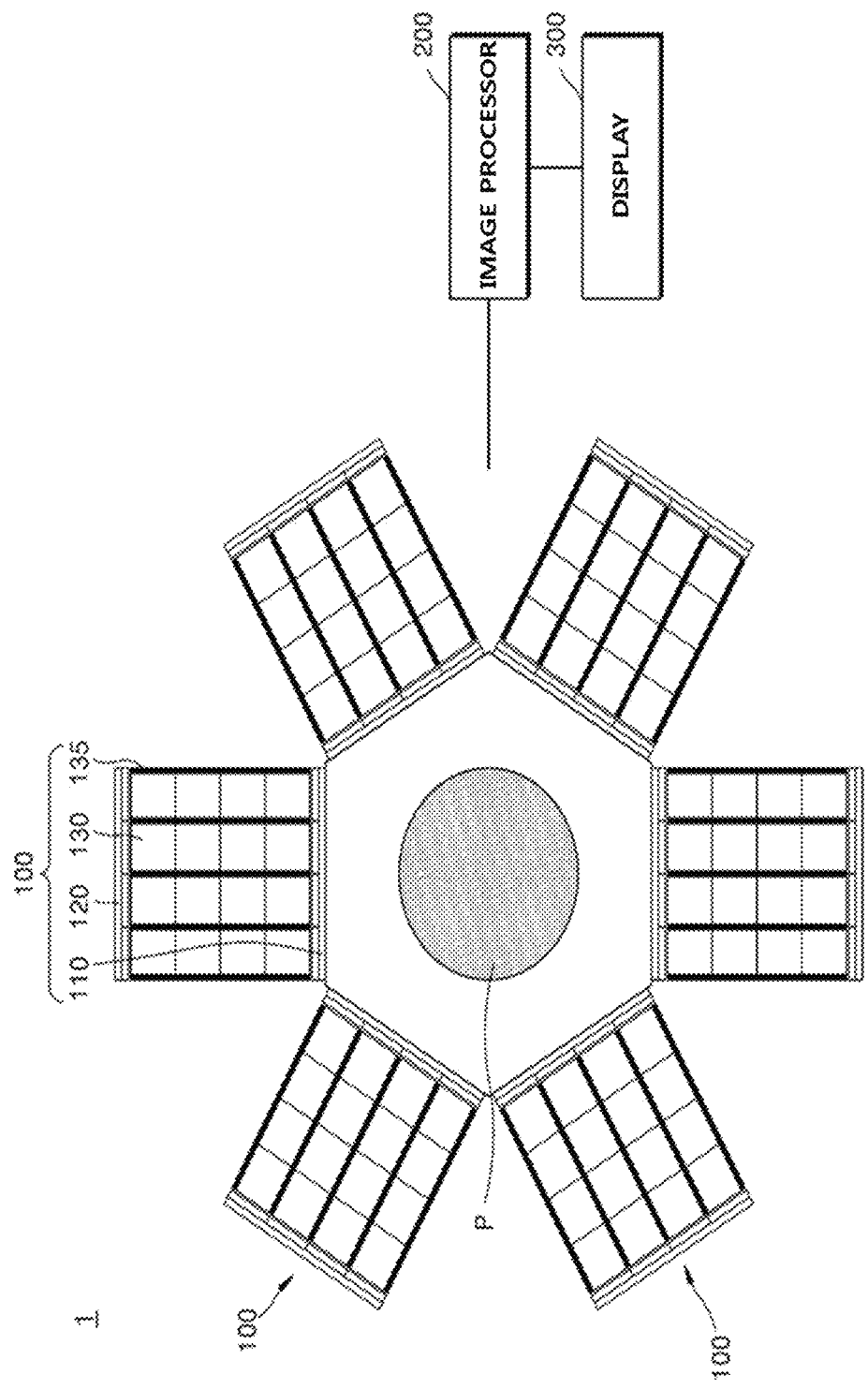

[FIG. 8]
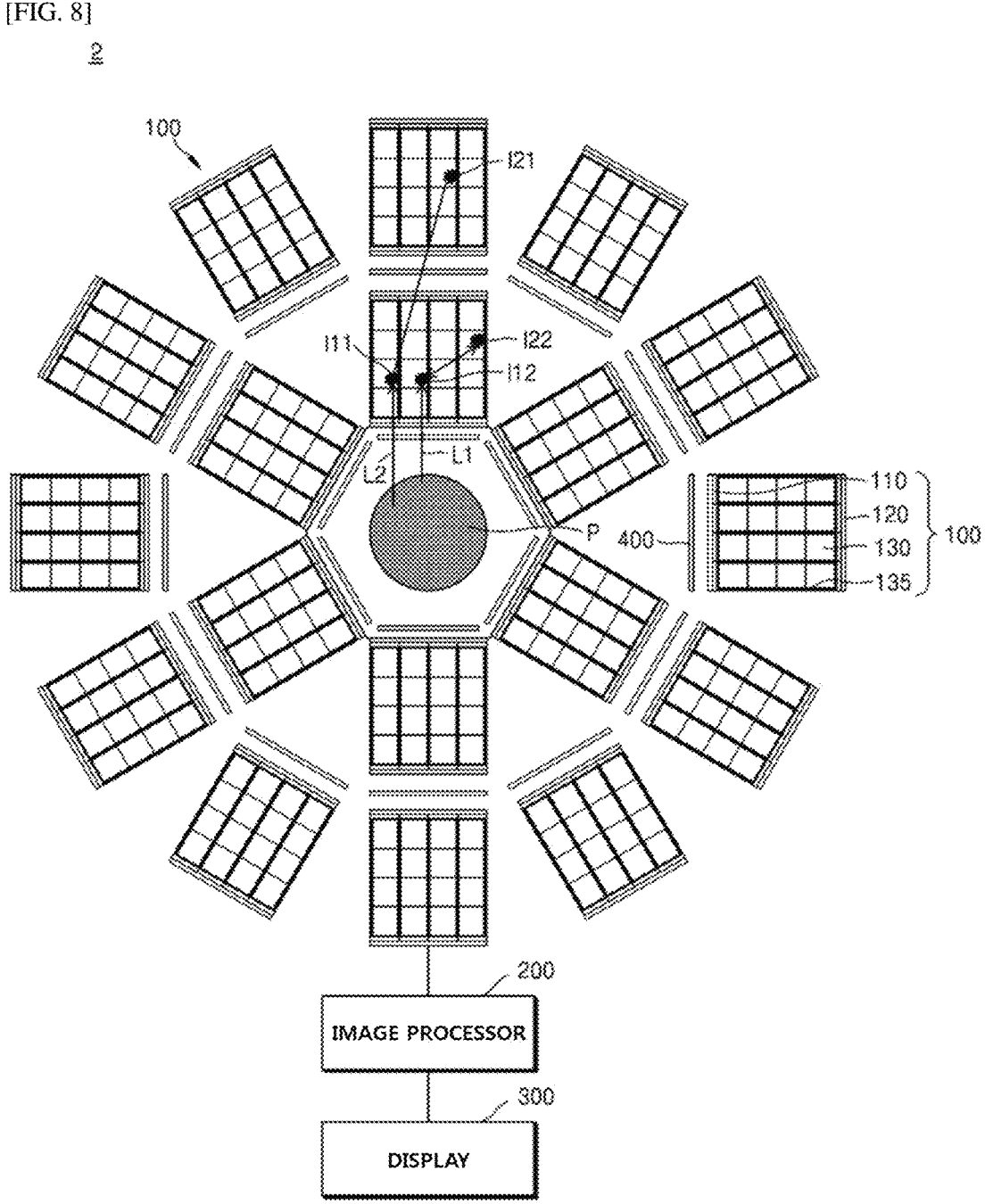

COMPTON IMAGING APPARATUS AND SINGLE PHOTON EMISSION AND POSITRON EMISSION TOMOGRAPHY SYSTEM COMPRISING SAME

CROSS REFERENCE TO RELATED APPLICATIONS

This application is a U.S. National Stage Application of International Application No. PCT/KR2020/003429, filed on Mar. 12, 2020, which claims the benefit under 35 USC 119(a) and 365(b) of Korean Patent Application No. 10-2019-0129188, filed on Oct. 17, 2019 in the Korean Intellectual Property Office, the entire disclosure of which is incorporated herein by reference for all purposes.

TECHNICAL FIELD

The present invention relates to a Compton imaging apparatus and a single photon emission and positron emission tomography system including the same. More particularly, the present invention relates to a Compton imaging apparatus based on a single scintillator and a single photon emission and positron emission tomography system including the same.

BACKGROUND ART

Since the development of the Compton camera, gamma-ray imaging has played an important role in many fields, including nuclear medicine, astronomy, security, and industrial applications. In nuclear medicine, a radioactive isotope is injected into the human body, and then radiation emitted from the human body is detected. Based on the radiation, morphological and functional information about diseased tissues is obtained to explore the physiology and pathology of the human body and to diagnose and treat diseases. In astronomy, various types of radiation generated in space are detected and used to analyze phenomena occurring in celestial bodies, such as formation and annihilation of stars.

Furthermore, regarding international terrorist threats, radiation detectors with high efficiency are used in ports and airports, for unopened searches of nuclear materials or contraband. Industrially, the Compton camera is widely used to detect radiation from an ordinary environment or to detect radioactive isotopes leaking from power plants and radioactive material waste sites.

When radiation is scattered by Compton scattering and absorbed elsewhere, the Compton camera generates an image through a Compton imaging technique of tracking back position information about incident radiation based on scattering and absorption positions and energy information. However, the existing Compton camera should use two or more detectors each including a scintillator, the detectors should be used separately for scattering and absorption, and radiation should be scattered in one detector and absorbed by the other detector, without any further reaction. Therefore, the efficiency is greatly decreased. Accordingly, studies have recently been made on a technology of forming an image through scattering and absorption of radiation in a single detector.

DETAILED DESCRIPTION OF THE INVENTION

Problems to be Solved by the Invention

An aspect of the present invention devised to solve the conventional problem is to provide a Compton imaging apparatus for reconstructing a Compton image based on a single scintillator, and a single photon emission and positron emission tomography system including the same.

It will be appreciated by persons skilled in the art that the objects that could be achieved with the present invention are not limited to what has been particularly described hereinabove and the above and other objects that the present invention could achieve will be more clearly understood from the following detailed description.

Means for Solving the Problems

A Compton imaging apparatus according to an embodiment of the present invention may include a scintillator including a plurality of scintillation cells reacting with incident radiation, at least one detector including a first photoelectric element located on one side of the scintillator, and a second photoelectric element located on the other side of the scintillator, and an image processor configured to generate an image by using reaction information obtained from the first photoelectric element and the second photoelectric element. The first photoelectric element and the second photoelectric element may obtain first reaction information about a first reaction caused by the incident radiation and second reaction information about a second reaction caused by radiation scattered by the first reaction. The image processor may calculate a separation distance between scintillation cells in which the first reaction and the second reaction have occurred by using the first reaction information and the second reaction information, and when the calculated separation distance is equal to or greater than a preset distance value, generate the image by using the first reaction information and the second reaction information.

In an embodiment, the first reaction information and the second reaction information may include reaction energy information about the reactions occurring in the scintillation cells, and the image processor may generate the image by correcting the reaction energy information about each of the scintillation cells.

In an embodiment, the first photoelectric element may include a first pixel, the second photoelectric element may include a second pixel corresponding to the first pixel, and the image processor may generate the image by excluding first reaction information and second reaction information about scintillation cells located between the first pixel and the second pixel, when the reactions occur in the scintillation cells located between the first pixel and the second pixel.

In an embodiment, the image processor may generate the image by assigning a weight to first reaction information and second reaction information corresponding to scintillation cells located in a direction perpendicular to an imaginary line connecting the first pixel to the second pixel.

In an embodiment, the weight may be linearly or geometrically proportional to distances between the imaginary line and the scintillation cells.

In an embodiment, the image processor may generate the image by assigning a weight according to a separation distance between the scintillation cells reacting with the radiation.

In an embodiment, the weight may be linearly or geometrically proportional to the separation distance.

In an embodiment, the first photoelectric element and the second photoelectric element may be multi-pixel photon counters (MPPCs).

In an embodiment, the scintillator may be located between the first photoelectric element and the second photoelectric element, and include a plurality of light guides spaced apart from each other, and the scintillation cells may be located between adjacent light guides.

In an embodiment, each of the scintillation cells may be elongated from the first photoelectric element toward the second photoelectric element.

In an embodiment, the first reaction information may include first reaction energy information measured by the first photoelectric element and second reaction energy information measured by the second photoelectric element, and the image processor may obtain position information about the first reaction corresponding to a direction from the first photoelectric element toward the second photoelectric element by using the first reaction energy information and the second reaction energy information.

In a single photon emission and positron emission tomography system comprising the Compton imaging apparatus according to an embodiment of the present invention, a plurality of detectors may be provided, surround a subject, and detect a plurality of rays of radiation emitted from the subject, and the image processor may generate an image by using reaction information obtained from the detectors.

In an embodiment, the single photon emission and positron emission tomography system may further include a plurality of collimators, each collimator being located between one of the detectors and the subject and configured to focus radiation scattered from the subject and transmit the focused radiation to the detector.

In an embodiment, some of the detectors may be grouped into a first group surrounding the subject, and the other detectors may be grouped into a second group surrounding the first group.

In an embodiment, the image processor may generate the image by using the first reaction information about the first reaction with the radiation incident on the detector being any one of the first group and the second reaction information about the second reaction with the radiation scattered by the first reaction in any one detector of the second group.

In an embodiment, the image processor may generate the image by using a maximum likelihood expectation maximization (MLEM) algorithm.

The features and advantages of the present invention will become more apparent from the following detailed description based on the accompanying drawings. The terms or words used in the present specification and claims should be interpreted not as conventional and dictionary meanings but as meanings and concepts consistent with the technical idea of the present invention based on the principle that the inventor can properly define the concepts of the terms to describe his invention in the best way.

Effects of the Invention

A Compton imaging apparatus according to embodiments of the present invention may reconstruct a Compton image based on a single scintillator including a plurality of scintillation cells. Accordingly, because compared to other Compton imaging apparatuses, the Compton imaging apparatus is inexpensive and has an excellent temporal resolution, the Compton imaging apparatus may be used in high-radiation areas.

Further, a single photon emission and positron emission tomography system using the Compton imaging apparatus may increase radiation detection efficiency and an image resolution, thereby increasing image quality.

It will be appreciated by persons skilled in the art that the effects that can be achieved with the present invention are not limited to what has been particularly described herein-above and other advantages of the present invention will be more clearly understood from the following detailed description taken in conjunction with the accompanying drawings.

BRIEF DESCRIPTION OF THE DRAWINGS

FIG. 1 is a diagram illustrating a Compton imaging apparatus according to an embodiment of the present invention.

FIG. 2 is a diagram illustrating a detector of FIG. 1.

FIGS. 3a and 3b are diagrams referred to for describing reactions occurring in a scintillator of FIG. 2.

FIG. 4 is a diagram illustrating an image generated by using reaction information obtained by a detector of FIG. 3.

FIG. 5 is a diagram illustrating a process of generating an image according to reactions different from those of FIG. 2 in an image processor.

FIG. 6 is a diagram illustrating a process of generating an image according to reactions different from those of FIGS. 2 and 5 in the image processor.

FIG. 7 is a diagram illustrating a positron emission tomography system according to another embodiment of the present invention.

FIG. 8 is a diagram illustrating a single photon emission tomography system according to another embodiment of the present invention.

BEST MODE FOR CARRYING OUT THE INVENTION

The advantages and features of the present invention, and a method of achieving them will become apparent with reference to the embodiments described below in detail in conjunction with the accompanying drawings. However, the present invention may be implemented in various different forms, not limited to the embodiments disclosed below, and only these embodiments are intended to provide a comprehensive understanding of the scope of the present invention to those skilled in the art. The present invention is only defined by the scope of the claims. Like reference numerals denote the same components throughout the specification.

A description of the embodiments will be given with reference to cross-sectional views and/or plan views, which are ideal illustrations of the present invention. In the drawings, the thicknesses of films and areas are exaggerated for an effective description of technical content. Accordingly, the areas illustrated in the drawings have schematic properties, and the shapes of the illustrated areas in the drawings are specific shapes of areas of the device, not intended to limit the scope of the invention. In various embodiments of the present invention, although terms such as first, second, third, and so on are used to describe various components, the components should not be limited by these terms. The terms are only used to distinguish one component from another. The embodiments described and illustrated herein also include complementary embodiments thereof.

The terminology used herein is for the purpose of describing the embodiments, not intended to limit the present invention. In this specification, singular forms also include plural referents unless stated otherwise. As used herein, "comprises" and/or "comprising" does not exclude the presence or addition of one or more other components, steps, operations, and/or elements in a referenced element, step, operation, and/or element.

In this specification, "connection" may mean both direct connection between mentioned components and indirect connection through an intermediate medium.

The terms and words as used herein, including technical or scientific terms, may have the same meanings as generally understood by those skilled in the art. Unless otherwise defined, the terms as generally defined in dictionaries should not be interpreted as ideally or excessively formal meanings.

FIG. 1 is a diagram illustrating a Compton imaging apparatus according to an embodiment of the present invention. FIG. 2 is a diagram illustrating a detector of FIG. 1. FIGS. 3a and 3b are diagrams referred to for describing reactions occurring in a scintillator of FIG. 2. FIG. 4 is a diagram illustrating an image generated by using reaction information obtained by a detector of FIG. 3.

Referring to FIGS. 1 to 4, a Compton imaging apparatus 10 according to an embodiment of the present invention may form an image of radiation L by the Compton scattering effect. The Compton imaging apparatus 10 may be used for industrial purposes, medical purposes, space observation, and so on. The Compton imaging apparatus 10 may include a detector 100, an image processor 200, and a display 300.

The detector 100 may obtain information about a detected position of the radiation L and energy information at the detection position. The detector 100 may include a scintillator 130, a first photoelectric element 110, and a second photoelectric element 120.

The scintillator 130 may include a plurality of scintillation cells 131 reacting with the incident radiation L. In an embodiment, each of the scintillation cells 131 may be formed of, but not limited to, one material selected from LSO, LYSO, LGSO, GSO, BGO, LuYAP, and BaF. In an embodiment, each of the scintillation cells 131 may be formed into, but not limited to, a rectangular parallelepiped having a square cross-section. This is intended to allow each of the scintillation cells 131 to detect a reaction only with a certain pulse of the radiation L and to direct scintillation to the first photoelectric element 110 and/or the second photoelectric element 120 through the center of the scintillation cell.

The scintillator 130 may be configured as a stack of layers each including a plurality of scintillation cells 131 (hereinafter, referred to as scintillation cell layers). In an embodiment, the scintillator 130 may be a stack of four scintillation cell layers each being a 4×4 scintillation cell matrix. Accordingly, the scintillator 130 may include, but not limited to, a total of 64 scintillation cells 131.

The first photoelectric element 110 may be located on one side of the scintillator 130. The second photoelectric element 120 may be located on the other side of the scintillator 130. Accordingly, the scintillator 130 may be interposed between the first photoelectric element 110 and the second photoelectric element 120. In an embodiment, the first photoelectric element 110 and the second photoelectric element 120 may face each other. In an embodiment, a direction from the first photoelectric element 110 to the second photoelectric element 120 may be an X-axis direction. In another embodiment, the direction from the first photoelectric element 110 to the second photoelectric element 120 may be a Y-axis direction or a Z-axis direction.

The scintillator 130 may include a plurality of light guides 135 located between the first photoelectric element 110 and the second photoelectric element 120. The plurality of light guides 135 may be spaced apart from each other. In an embodiment, the plurality of light guides 135 may be arranged along the Z-axis direction perpendicular to the X-axis direction. In another embodiment, the plurality of light guides 135 may be arranged along the Y-axis and Z-axis directions.

Each of the scintillation cells 131 may be located between adjacent light guides 135. For example, each of the aforementioned scintillation cell layers may be located between adjacent light guides 135. Accordingly, the plurality of light guides 135 may prevent light generated by reactions of the scintillation cells 131 from spreading.

In an embodiment, a single scintillation cell layer may be an array of a plurality of scintillation cells 131 arranged in a matrix on an X-Y plane. Alternatively, a single scintillation cell layer may include a single scintillation cell 131. In another embodiment, each of the scintillation cells 131 may be elongated from the first photoelectric element 110 toward the second photoelectric element 120. Accordingly, a single scintillation cell layer may be a combination of a plurality of scintillation cells 131 each being elongated in the X-axis direction, arranged in the Y-axis direction.

The first photoelectric element 110 may include a plurality of pixels 111 and a first electronic substrate 115. The plurality of pixels 111 may be located on the first electronic substrate 115. In an embodiment, the pixels 111 may be arranged in a 4×4 matrix on the first electronic substrate 115. For example, the pixels 111 may be arranged in a Y-Z plane matrix on the first electronic substrate 115. The plurality of pixels 111 may be electrically coupled to the first electronic substrate 115.

The first photoelectric element 110 may obtain first reaction information about a first reaction I1 of the scintillation cells 131 with the incident radiation L. In addition, the first photoelectric element 110 may obtain second reaction information about a second reaction I2 of the scintillation cells 131 with the radiation L scattered by the first reaction I1. This will be described later in detail.

The second photoelectric element 120 may include a plurality of pixels 121 and a second electronic substrate 125. The plurality of pixels 121 may be located on the second electronic substrate 125. In an embodiment, the pixels 121 may be arranged in a 4×4 matrix on the second electronic substrate 125. For example, the pixels 121 may be arranged in a Y-Z plane matrix on the second electronic substrate 125. The plurality of pixels 121 may be electrically coupled to the second electronic substrate 125.

Let any one of the pixels 111 of the first photoelectric element 110 referred to as a first pixel 111. Then, a pixel 121 of the second photoelectric element 120 corresponding to the first pixel 111 is referred to as a second pixel 121. In an embodiment, the first pixel 111 and the second pixel 121 may face each other. An imaginarily drawn line (hereinafter, referred to as an imaginary line) IL connecting the first pixel 111 to the second pixel 121 may pass through the scintillator 130. In an embodiment, the imaginary line IL may be parallel to the X-axis direction.

Like the first photoelectric element 110, the second photoelectric element 120 may also obtain the first reaction information about the first reaction I1 of the scintillation cells 131 with the incident radiation L. In addition, the second photoelectric element 120 may obtain the second reaction information about the second reaction I2 of the scintillation cells 131 with the radiation L scattered by the first reaction I1. In an embodiment, the first photoelectric element 110 and the second photoelectric element 120 may obtain the first reaction information and the second reaction information almost simultaneously.

Each of the first photoelectric element 110 and the second photoelectric element 120 may be, but not limited to, a silicon photomultiplier (SiPM), a multi-pixel photon counter (MPPC), or a solid-state photomultiplier (SSPM). The first photoelectric element 110 and the second photoelectric element 120 may have a self-amplification factor of $10^5$ or more. Accordingly, because the first photoelectric element 110 and the second photoelectric element 120 are robust against electrical noise, a first electric circuit and a second electric circuit may be easily manufactured. The first photoelectric element 110 and the second photoelectric element 120 may transmit the obtained first reaction information and second reaction information to the image processor 200.

The image processor 200 may generate an image by using the first reaction information and the second reaction information. The image processor 200 may obtain information about positions at which multiple reactions have occurred by using the first reaction information and the second reaction information. Multiple reactions occurring in the scintillator 130 will be described below with reference to FIG. 3.

The radiation L from a radiation source R may be incident on any one (hereinafter, referred to as a first scintillation cell) of the scintillation cells 131 of the scintillator 130. The scattering reaction I1 may occur in the first scintillation cell on which the radiation L is incident by the Compton scattering effect. Accordingly, first reaction energy may be emitted from the first scintillation cell in which the scattering reaction I1 has occurred. For example, the first reaction energy may be light generated by the scattering reaction I1. The light generated from the first scintillation cell may travel to the first photoelectric element 110 and the second photoelectric element 120 by adjacent light guides. For example, the light generated through the first reaction I1 may travel from the first scintillation cell to the first pixel 111 and the second pixel 121 located in the X-axis direction. Accordingly, the first pixel 111 and the second pixel 121 may receive the light generated by the first reaction I1 almost simultaneously through the light guides 135 and generate first current signals corresponding to the light. The first current signals may correspond to first reaction energy information. Accordingly, the first photoelectric element 110 and the second photoelectric element 120 may detect the first reaction energy.

The image processor 200 may calculate first reaction position information about a position where the scattering reaction I1 has occurred from the first reaction energy detected by the first photoelectric element 110 and the second photoelectric element 120. In an embodiment, the image processor 200 may use the magnitude of the first current signal generated by the first photoelectric element 110 and the magnitude of the first current signal generated by the second photoelectric element 120 to calculate the first reaction position information about the first scintillation cell. For example, the image processor 200 may obtain coordinate information corresponding to the X axis of first position information by the following calculation formula.

X coordinate information=K(magnitude of first current signal generated in first pixel)/(magnitude of first current signal generated in first pixel+ magnitude of second current signal generated in second pixel),(K is a constant)     Calculation formula)

In addition, the image processor 200 may obtain position information (X, Y, Z coordinates) by using pre-stored Y and Z coordinate information about the first pixel 111 and/or pre-stored Y and Z coordinate information about the second pixel 121.

The scattered radiation L may be absorbed by any one (referred to as a second scintillation cell) of the other scintillation cells 131 except for the first scintillation cell. The absorption reaction I2 may occur in the second scintillation cell that has absorbed the scattered radiation L. Accordingly, second reaction energy may be emitted from the second scintillation cell in which the absorption reaction I2 has occurred. For example, the second reaction energy may be light energy generated by the absorption reaction I2. Light generated from the second scintillation cell may travel to the first photoelectric element 110 and the second photoelectric element 120 by adjacent light guides. For example, light generated by the second reaction I1 may travel from the second scintillation cell to the first pixel 111 and the second pixel 121 located in the X-axis direction. Therefore, the first pixel 111 and the second pixel 121 may receive the light generated by the second reaction I1 through the light guides 135 almost simultaneously, and generate second current signals corresponding to the light. The second current signals may correspond to second reaction energy information. Accordingly, the first photoelectric element 110 and the second photoelectric element 120 may detect the second reaction energy.

The image processor 200 may calculate second reaction position information about a position at which the absorption reaction I2 has occurred from the second reaction energy detected by the first photoelectric element 110 and the second photoelectric element 120. In an embodiment, the image processor 200 may calculate the second reaction position information about the second scintillation cell by using the magnitude of the second current signal generated by the first photoelectric element 110 and the magnitude of the second current signal generated by the second photoelectric element 120. For example, the image processor 200 may obtain coordinate information corresponding to the X axis of second position information by the above formula.

Further, the image processor 200 may obtain the second position information (X, Y, Z coordinates) about the second scintillation cell by using pre-stored Y and Z coordinate information about the first pixel 111 and/or pre-stored Y and Z coordinate information about the second pixel 121.

In an embodiment, the first reaction position information and the second reaction position information may be three-dimensional position information represented as X, Y, and Z coordinates. For example, the (X, Y, Z) coordinates of the first scintillation cell may be (X2, Y4, Z2), and the (X, Y, Z) coordinates of the second scintillation cell may be (X4, Y2, Z1).

The image processor 200 may calculate the position of a radiation source R by using the first reaction energy information, the second reaction energy information, the first reaction position information, and the second reaction position information. For example, the image processor 200 may determine the trajectory of scattered photons based on the first reaction information and the second reaction information, and calculate a scattering angle by using the first reaction energy information, the second reaction energy information, and the Compton scattering formula. The image processor 200 may determine the position of the radiation source R by performing back-projection in the form of a cone at the first reaction position based on the first reaction position information and scattering angle information. Since numerous rays of the radiations are generated from the actual radiation source R, the image processor 200 may form a plurality of back-projected cone shapes, and generate an image by back-projecting the formed cones to an image box and converting the number of cones accumulated at each position into a relative brightness.

However, the image processor 200 in the Compton imaging apparatus 10 of the present invention may calculate a separation distance D between the first scintillation cell and the second scintillation cell in which the first reaction I1 and the second reaction I2 have occurred by using the first reaction information and the second reaction information. When the calculated separation distance D is equal to or greater than a preset distance value, the image processor 200 may generate an image by using the first reaction information and the second reaction information. In an embodiment, the separated scintillation cells 131 may be configured in a pair. As described above, one of the pair of scintillation cells 131 may be the first scintillation cell in which the scattering reaction I1 occurs by the incident radiation L. The other one of the pair of scintillation cells 131 may be the second scintillation cell in which the absorption reaction I2 occurs for the radiation L scattered by the scattering reaction H.

For example, when the separation distance D1 between the first scintillation cell and the second scintillation cell is equal to or greater than the preset distance value, the image processor 200 may generate an image by using the first reaction information and the second reaction information corresponding to the reaction of the first scintillation cell and the reaction of the second scintillation cell. This is because, when the separation distance D1 between the first scintillation cell and the second scintillation cell is small, interference occurs between the scattering reaction I1 and the absorption reaction I2. Accordingly, when the separation distance D1 between the first scintillation cell and the second scintillation cell is equal to or greater than the preset distance value, the image processor 200 may generate an accurate image due to minimization of the interference between the scattering reaction I1 and the absorption reaction I2. However, as the separation distance between the first scintillation cell and the second scintillation cell increases, the resolution of the image may increase, while radiation detection efficiency may decrease. Therefore, the preset distance value may be set preferably in consideration of the image resolution and the radiation detection efficiency.

The image processor 200 may generate an image by assigning a weight according to the separation distance D1 between the scintillation cells 131 which react with the radiation L. The weight may be linearly or geometrically proportional to the separation distance D1. For example, the weight may be proportional to the separation distance D1, the square of the separation distance D1, the cube of the separation distance D1, or the like.

The image processor 200 may be a computer unit such as a microcontroller or a central processing unit (CPU), which computes information, calculates information, and generates signals. In an embodiment, the image processor 200 may generate an image by correcting reaction energy information about each of the scintillation cells 131 in order to reflect interference between the reactions of the scintillation cells 131. When the reaction energy information about each of the scintillation cells 131 is corrected, the image processor 200 may generate an image that minimizes the interference between the reactions of the scintillation cells 131. Accordingly, the accuracy of the image may be improved.

When the image processor 200 corrects the reaction energy information for each of the scintillation cells 131, a load may be imposed on the image processor 200. Accordingly, in another embodiment, the image processor 200 may generate an image by correcting energy information for each combination of some scintillation cells 131.

The display 300 may visually output the image generated by the image processor 200. FIG. 4 illustrates an image generated by the image processor 200 and displayed on the display 300.

The Compton imaging apparatus 10 according to an embodiment of the present invention may include a single detector 100. In another embodiment, the Compton imaging apparatus 10 may include a plurality of detectors 100 to increase the radiation detection efficiency and the resolution.

MODE FOR CARRYING OUT THE INVENTION

FIG. 5 is a diagram illustrating a process of generating an image in the image processor according to reactions different from those of FIG. 2.

Referring to FIGS. 1 to 5, the image processor 200 may determine whether reactions have occurred in scintillation cells 131 located between the above-described first pixel 111 and second pixel 121 by using first reaction information and second reaction information. For example, the image processor 200 may calculate a first reaction position and a second reaction position by using the first reaction information and the second reaction information. When the first reaction I1 and the second reaction I2 have occurred between the first pixel 111 and the second pixel 121, the first pixel 111, the second pixel 121, and the first reaction position, and the second reaction position may be the same in the (Y, Z) coordinates and different in the X coordinates. In this case (hereinafter, referred to as collinear reactions), the image processor 200 may determine that the first reaction I1 and the second reaction I2 have occurred in the scintillation cells 131 located between the first pixel 111 and the second pixel 121. When the collinear reactions occur, the image processor 200 may not distinguish the scattering reaction I1 from the absorption reaction I2 by using the first reaction information and the second reaction information. Therefore, in the case of collinear reactions, the image processor 200 may generate an image by excluding first reaction information and second reaction information about the scintillation cells 131 located between the first pixel 111 and the second pixel 121.

However, in the case of collinear reactions, the image processor 200 may generate an image by assigning a weight to the first reaction information and the second reaction information corresponding to scintillation cells 131 located in a direction perpendicular to the above-described imaginary line IL. In the present specification, the weight may be a number greater than 1, and a threshold may be a number less than 1. This is because in the case of collinear reactions, a reaction from another scintillation cell located on the imaginary line IL causes more interference than a reaction from another scintillation cell located in the direction perpendicular to the imaginary line IL.

The weight may be linearly or geometrically proportional to the distance (referred to as orthogonal distance) between the imaginary line and the scintillation cell. For example, the weight may be proportional to the orthogonal distance, the square of the orthogonal distance, the cube of the orthogonal distance, or the like.

Further, when a weight is assigned according to an orthogonal distance, the image processor 200 may calculate uncertainty according to position information and energy information about the scintillation cell. The image processor 200 may assign an independent weight to each of the scintillation cells located in the direction perpendicular to the imaginary line IL by using the calculated uncertainty, or assign a weight by calculating an average value such as an arithmetic average or a geometric average. The weight may be inversely proportional to the uncertainty.

FIG. 6 is a diagram illustrating a process of generating an image in the image processor according to reactions different from those of FIGS. 2 and 5.

Referring to FIGS. 1 to 6, when collinear reactions occur, the image processor 200 may assign a weight to each combination of scintillation cells in the direction perpendicular to the imaginary line IL, not to each of the distances between the imaginary line IL and the scintillation cells located in the perpendicular direction. A scintillation cell combination may refer to a unit of scintillation cells 131 located in one direction perpendicular to the imaginary line IL.

In an embodiment, when collinear reactions occur, the image processor 200 may assign a weight to each scintillation cell combination in the direction perpendicular to the imaginary line IL. For example, the image processor 200 may generate an image by assigning a first weight to scintillation cell combinations C1 and C3 located in one direction perpendicular to the imaginary line IL and parallel to the Z axis. In addition, the image processor 200 may generate the image by assigning a second weight different from the first weight to a scintillation cell combination C2 located in another direction perpendicular to the imaginary line IL and parallel to the Z axis. In an embodiment, the first weight and the second weight may be calculated by using the afore-mentioned uncertainty.

FIG. 7 is a diagram illustrating a positron emission tomography (PET) system according to an embodiment of the present invention. For simplicity of description, the description of the same components as those described with reference to FIGS. 1 to 6 will be omitted or simplified.

Referring to FIG. 7, a PET system 1 according to another embodiment of the present invention may include a plurality of Compton imaging apparatuses. In an embodiment, since two identical rays of energy radiation are emitted in opposite directions from the radiation source P, the position of the radiation source P is on a line drawn between positions at which the two rays of radiation are detected, and imaging the position of the radiation source P is called PET. Therefore, the PET system 1 of the present invention may obtain position information about the radiation source by using PET.

The PET system 1 according to an embodiment of the present invention may include the Compton imaging apparatuses described with reference to FIGS. 1 to 6. In an embodiment, the PET system 1 may include a plurality of detectors 100, the image processor 200, and the display 300.

Each of the plurality of detectors 100 may include the scintillator 130, the first photoelectric element 110, and the second photoelectric element 120. The scintillator 130 may include the plurality of scintillation cells 131 and the plurality of light guides 135. The first photoelectric element 110 may include the plurality of pixels 111 and the first electronic substrate 115. The second photoelectric element 120 may include the plurality of pixels 121 and the second electronic substrate 125.

The plurality of detectors 100 may surround the subject P. Accordingly, the plurality of detectors 100 may detect the rays of radiation of the subject P which emits two identical rays of radiation in the opposite directions. In another embodiment, a single photon emission tomography (SPECT) system using a Compton imaging apparatus may detect rays of radiation emitted in all directions from the radiation source by the plurality of detectors 100.

In an embodiment, the plurality of detectors 100 surrounding the subject may form, but not limited to, a substantially hexagonal column.

The image processor 200 may generate an image by using first reaction information and second reaction information received from each of the plurality of detectors 100. In the PET system, because the plurality of detectors 100 surround the subject, the resulting increased radiation detection efficiency leads to a dramatic increase in the image quality. Further, radiation exposure of a patient or an operator may be greatly reduced. A PET system according to another embodiment of the present invention may increase the radiation efficiency and the resolution by surrounding the subject with the plurality of detectors 100 doubly or triply.

The PET system according to an embodiment of the present invention may be applied to an SPECT system by adding a configuration such as a collimator to the PET system.

FIG. 8 is a diagram illustrating an SPECT system according to another embodiment of the present invention. For simplicity of description, the description of the same components as those described in FIGS. 1 to 7 will be omitted or simplified.

Referring to FIG. 8, an SPECT system 2 according to an embodiment of the present invention may include a plurality of Compton imaging apparatuses. In an embodiment, the SPECT system may generate an image by using a single ray of radiation (e.g., gamma ray) emitted from the radiation source P. That is, the SPECT system 2 may generate an image through SPECT.

The SPECT system 2 may include the Compton imaging devices described with reference to FIGS. 1 to 6. In an embodiment, the SPECT system 2 may include a plurality of detectors 100, the image processor 200, and the display 300. In addition, the SPECT system 2 may further include collimators 400.

Each of the plurality of detectors 100 may include the scintillator 130, the first photoelectric element 110, and the second photoelectric element 120. The scintillator 130 may include the plurality of scintillation cells 131 and the plurality of light guides 135. The first photoelectric element 110 may include the plurality of pixels 111 and the first electronic substrate 115. The second photoelectric element 120 may include the plurality of pixels 121 and the second electronic substrate 125.

The plurality of detectors 100 may surround the subject P. The plurality of detectors 100 may be grouped into a plurality of groups surrounding the subject P multiple times. In an embodiment, the plurality of detectors 100 may be grouped into a first group surrounding the subject P and a second group surrounding the first group. In another embodiment, the detectors 100 may further be grouped into a third group surrounding the second group.

Radiation emitted from the subject P may be incident to any one of the detectors 100. For example, first radiation L1 and second radiation L2 emitted from the subject P may be incident on any one (referred to as a first incident detector) of the detectors 100 in the first group.

The first radiation L1 may be scattered through a scattering reaction (a first reaction I12) in any one of the scintillation cells of the first incident detector. The first radiation L1 scattered through the scattering reaction I12 may be absorbed (a second reaction) by another scintillation cell in the first incident detector. The first incident detector may obtain first reaction information (referred to as first scattering information) corresponding to the scattering reaction I12 caused by the first radiation L1. The first incident detector may also obtain second reaction information (referred to as first absorption information) corresponding to an absorption reaction I22 with the first radiation L1.

The second radiation L2 may be scattered through a scattering reaction (a first reaction I11) in any one of the scintillation cells of the first incident detector. The second radiation L2 scattered through the scattering reaction I11 may be incident on any one (referred to as a second incident detector) of the detectors of the second group. The scattered second radiation L2 may be absorbed (a second reaction I21) by any one of the scintillation cells of the second incident detector. The first incident detector may obtain first reaction information (referred to as second scattering information) corresponding to the scattering reaction I11 to the second radiation L2. The second incident detector may also obtain second reaction information (referred to as second absorption information) corresponding to the absorption reaction I21 with the second radiation L2. Accordingly, a separation distance between the scattering reaction I12 and the absorption reaction I22 with the first radiation L1 is shorter than a separation distance between the scattering reaction I11 and the absorption reaction I21 with the second radiation L2. Accordingly, the detection efficiency of the first radiation L1 may be greater than the detection efficiency of the second radiation L2. That is, a first image generated by the reactions with the first radiation L1 may have a higher image quality than a second image generated by the reactions with the second radiation L2.

Each of the collimators 400 may be coupled to one of the detectors 100. Each of the collimators 400 may be located between one of the detectors 100 and the subject P. Accordingly, each of the collimators 400 may focus radiation scattered from the subject P and transmit the focused radiation to one of the detectors 100. For example, the collimator 400 may detect radiation having a desired directionality by geometrically limiting the radiation.

Multiple types of collimators 400 may be used depending on detection sites and purposes. For example, each of the collimators 400 may be a parallel hole collimator, a pinhole collimator, a URA, a MURA, a HURA, or the like.

The image processor 200 may generate an image by using the first reaction information and the second reaction information received from each of the plurality of detectors 100. In an embodiment, the image processor 200 may generate a first image based on the first radiation L1 by using the first scattering information and the first absorption information obtained by the first incident detector. In addition, the image processor 200 may generate a second image based on the second radiation L2 by using the second scattering information obtained by the first incident detector and the second absorption information obtained by the second incident detector.

As described above, as the distance between a scattering reaction and an absorption reaction increases, the resolution of an image may be increased. Accordingly, the resolution of the first image may be lower than that of the second image. That is, this is because the distance between the scattering reaction and the absorption reaction used in the first image is smaller than the distance between the scattering reaction and the absorption reaction used in the second image.

To compensate for the shortcomings of the first image and the second image, the image processor 200 may generate a third image by the first scattering information, the first absorption information, the second scattering information, and the second absorption information. The third image may have a higher image resolution than the first image and higher image quality than the second image.

In an embodiment, the image processor 200 may generate the third image based on the first scattering information, the first absorption information, the second scattering information, and the second absorption information by a maximum likelihood expectation maximization (MLEM) algorithm, which should not be construed as limiting. The MLEM algorithm is an algorithm which has been created based on the Poisson probability distribution, in consideration of statistical errors. According to the MLEM algorithm, a most likely radiation source distribution is reconstructed into an image in consideration of the probabilistic distribution of information. However, as described above, the image processor 200 may calculate a separation distance between scintillation cells in which the first reaction (the scattering reaction I12 or I11) and the second reaction (the absorption reaction I21 or I22) have occurred, and when the calculated separation distance is equal to or greater than a preset distance value, may generate a third image by using the first scattering information, the first absorption information, the second scattering information, and the second absorption information.

While FIG. 8 has been described in the context of the SPECT system 2, the description of FIG. 8 may also be applied to the PET system or the like.

Although the present invention has been described in detail through specific embodiments, they are intended to describe the present invention in detail, not limiting the present invention. It is apparent to those skilled in the art that many alterations or modifications can be made within the scope and spirit of the present invention.

All of simple modifications or changes of the present invention fall within the scope of the present invention, and the specific protection scope of the present invention will be made clear by the appended claims.

DESCRIPTION OF REFERENCE NUMERALS

10: Compton imaging apparatus 100: detector
110: first photoelectric element 120: second photoelectric element
130: scintillator 200: image processor
300: display

INDUSTRIAL APPLICABILITY

The Compton imaging apparatus of the present invention may reconstruct a Compton image based on a single scintillator including a plurality of scintillation cells. Therefore, compared to other Compton imaging apparatuses, the Compton imaging apparatus is inexpensive and has an excellent temporal resolution, which makes the Compton imaging apparatus useful even in a high-radiation area.

The invention claimed is:

1. A Compton imaging apparatus comprising:
a scintillator including a plurality of scintillation cells reacting with incident radiation;
at least one detector including a first photoelectric element located on one side of the scintillator, and a second photoelectric element located on the other side of the scintillator; and
an image processor configured to generate an image by using reaction information obtained from the first photoelectric element and the second photoelectric element,
wherein the first photoelectric element and the second photoelectric element obtain first reaction information about a first reaction caused by the incident radiation and second reaction information about a second reaction caused by radiation scattered by the first reaction, wherein the image processor calculates a separation distance between scintillation cells in which the first reaction and the second reaction have occurred by using the first reaction information and the second reaction information, and when the calculated separation distance is equal to or greater than a preset distance value, generates the image by using the first reaction information and the second reaction information, and wherein the first photoelectric element includes a first pixel; the second photoelectric element includes a second pixel corresponding to the first pixel; and the image processor generates the image by excluding first reaction information and second reaction information about scintillation cells located between the first pixel and the second pixel when the reactions occur in the scintillation cells located between the first pixel and the second pixel.

2. The Compton imaging apparatus according to claim 1, wherein the first reaction information and the second reaction information include reaction energy information about the reactions occurring in the scintillation cells, and the image processor generates the image by correcting the reaction energy information about each of the scintillation cells.

3. The Compton imaging apparatus according to claim 1, wherein the image processor generates the image by assigning a weight to first reaction information and second reaction information corresponding to scintillation cells located in a direction perpendicular to an imaginary line connecting the first pixel to the second pixel.

4. The Compton imaging apparatus according to claim 3, wherein the weight is linearly or geometrically proportional to distances between the imaginary line and the scintillation cells.

5. The Compton imaging apparatus according to claim 1, wherein the image processor generates the image by assigning a weight according to a separation distance between the scintillation cells reacting with the radiation.

6. The Compton imaging apparatus according to claim 5, wherein the weight is linearly or geometrically proportional to the separation distance.

7. The Compton imaging apparatus according to claim 1, wherein the first photoelectric element and the second photoelectric element are multi-pixel photon counters (MPPCs).

8. The Compton imaging apparatus according to claim 1, wherein the scintillator is located between the first photoelectric element and the second photoelectric element, includes a plurality of light guides spaced apart from each other; and the scintillation cells are located between adjacent light guides.

9. The Compton imaging apparatus according to claim 8, wherein each of the scintillation cells is elongated from the first photoelectric element toward the second photoelectric element.

10. The Compton imaging apparatus according to claim 1, wherein the first reaction information includes first reaction energy information measured by the first photoelectric element and second reaction energy information measured by the second photoelectric element, and wherein the image processor obtains position information about the first reaction corresponding to a direction from the first photoelectric element toward the second photoelectric element by using the first reaction energy information and the second reaction energy information.

11. A single photon emission and positron emission tomography system comprising the Compton imaging apparatus according to claim 1, wherein a plurality of detectors are arranged to surround a subject, and detect a plurality of rays of radiation emitted from the subject, and wherein the image processor generates an image by using reaction information obtained from the detectors.

12. The single photon emission and positron emission tomography system according to claim 11, further comprising a plurality of collimators, each collimator being located between one of the detectors and the subject and configured to focus radiation scattered from the subject and transmit the focused radiation to the detector.

13. The single photon emission and positron emission tomography system according to claim 11, wherein some detectors are grouped into a first group surrounding the subject, and others are grouped into a second group surrounding the first group.

14. The single photon emission and positron emission tomography system according to claim 13, wherein the image processor generates the image by using the first reaction information about the first reaction with the radiation incident on the detector being any one of the first group and the second reaction information about the second reaction with the radiation scattered by the first reaction in any one detector of the second group.

15. The single photon emission and positron emission tomography system according to claim 11, wherein the image processor generates the image by using a maximum likelihood expectation maximization (MLEM) algorithm.

\* \* \* \* \*